US010421023B2

(12) United States Patent
Ikemoto et al.

(10) Patent No.: US 10,421,023 B2
(45) Date of Patent: Sep. 24, 2019

(54) PORTABLE TOY AND COMMUNICATION SYSTEM OF AMUSEMENT FACILITY USING THE SAME

(71) Applicant: Murata Manufacturing Co., Ltd., Nagaokakyo-shi, Kyoto-fu (JP)

(72) Inventors: Nobuo Ikemoto, Nagaokakyo (JP); Ai Miyabayashi, Nagaokakyo (JP); Jun Sasaki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/005,900

(22) Filed: Jun. 12, 2018

(65) Prior Publication Data

US 2018/0290064 A1 Oct. 11, 2018

Related U.S. Application Data

(63) Continuation of application No. PCT/JP2016/087042, filed on Dec. 13, 2016.

(30) Foreign Application Priority Data

Dec. 14, 2015 (JP) ................................ 2015-243460

(51) Int. Cl.
*A63H 3/00* (2006.01)
*A63G 31/00* (2006.01)
(Continued)

(52) U.S. Cl.
CPC ............. *A63H 3/003* (2013.01); *A63G 31/00* (2013.01); *A63H 3/02* (2013.01); *A63H 3/28* (2013.01);
(Continued)

(58) Field of Classification Search
CPC ......... A63H 3/003; A63H 3/28; H04W 4/024; H04W 4/30; H04W 64/006; G06Q 50/10
See application file for complete search history.

(56) References Cited

U.S. PATENT DOCUMENTS

2002/0049606 A1* 4/2002 Dan ...................... G06Q 30/02 705/1.1
2005/0108912 A1 5/2005 Bekker
(Continued)

FOREIGN PATENT DOCUMENTS

JP 3083732 U 2/2002
JP 2002149951 A 5/2002
(Continued)

OTHER PUBLICATIONS

International Search Report issued for PCT/JP2016/087042, dated Mar. 7, 2017.

(Continued)

*Primary Examiner* — Qun Shen
(74) *Attorney, Agent, or Firm* — Arent Fox LLP

(57) ABSTRACT

A portable toy carried by a visitor of an amusement facility has a first antenna, a first transceiver that executes near field communication with a communication terminal installed in the amusement facility through the first antenna, a second antenna, a second transceiver that executes far field communication with a mobile terminal carried by the visitor through the second antenna, a memory that is connected to at least one of the first and the second transceivers, and a controller that stores information on the visitor received from the mobile terminal by the second transceiver through the second antenna, in the memory.

10 Claims, 7 Drawing Sheets

100
150
ATTRACTION 104A
116 114A
ATTRACTION 104C
114C
104B
ATTRACTION
112
HOTEL
104D
ATTRACTION
114B
122
114D
120B
108
RESTAURANT
118B
110
106
SHOP
118A
ENTRANCE GATE
120A

(51) Int. Cl.

| | |
|---|---|
| ***G06Q 50/10*** | (2012.01) |
| ***H04W 4/024*** | (2018.01) |
| ***H04W 4/30*** | (2018.01) |
| ***A63H 3/28*** | (2006.01) |
| ***H04W 64/00*** | (2009.01) |
| ***A63H 3/02*** | (2006.01) |
| ***H04L 29/08*** | (2006.01) |
| ***H04W 12/00*** | (2009.01) |

(52) U.S. Cl.

CPC ............. *G06Q 50/10* (2013.01); *H04L 67/22* (2013.01); *H04W 4/024* (2018.02); *H04W 4/30* (2018.02); *H04W 64/006* (2013.01); *A63H 2200/00* (2013.01); *H04W 12/00* (2013.01)

(56) References Cited

U.S. PATENT DOCUMENTS

2008/0222127 A1* 9/2008 Bergin .................. G06Q 10/10
2013/0318784 A1* 12/2013 Elliott ...................... A63H 3/02 29/805
2014/0194092 A1* 7/2014 Wanstedt ............... G06Q 50/10 455/406
2015/0290548 A1* 10/2015 Meyers .................... A63H 3/28 446/397
2017/0131105 A1* 5/2017 Buscemi .............. G01C 21/206

FOREIGN PATENT DOCUMENTS

| | | | |
|---|---|---|---|
| JP | 2002269508 | A | 9/2002 |
| JP | 2004046904 | A | 2/2004 |
| JP | 2004326406 | A | 11/2004 |
| JP | 2006115017 | A | 4/2006 |
| JP | 2006285843 | A | 10/2006 |
| JP | 2007517282 | A | 6/2007 |

OTHER PUBLICATIONS

Written Opinion of the International Searching Authority issued for PCT/JP2016/087042, dated Mar. 7, 2017.

* cited by examiner

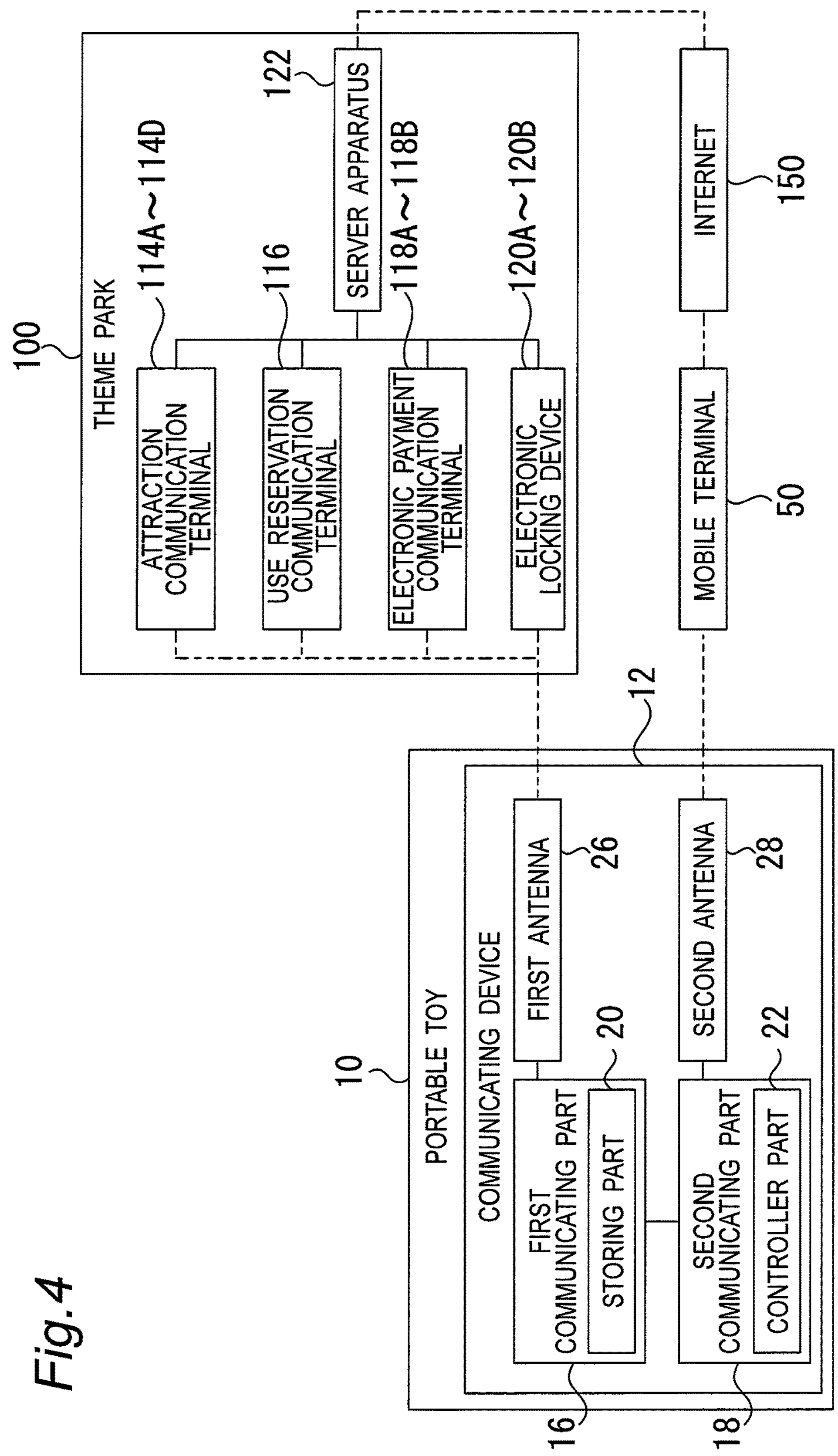
Fig.4
100
THEME PARK
ATTRACTION COMMUNICATION TERMINAL
114A~114D
USE RESERVATION COMMUNICATION TERMINAL
116
ELECTRONIC PAYMENT COMMUNICATION TERMINAL
118A~118B
ELECTRONIC LOCKING DEVICE
120A~120B
SERVER APPARATUS
122
MOBILE TERMINAL
50
INTERNET
150
12
10
PORTABLE TOY
COMMUNICATING DEVICE
FIRST ANTENNA
26
SECOND ANTENNA
28
FIRST COMMUNICATING PART
STORING PART
20
SECOND COMMUNICATING PART
CONTROLLER PART
22
16
18

ATTRACTION
104A
124
114A
122
Gd
Gd
12
10
S1
P
Sd2
Sd2
Sd1
S2
50
50a
150

PORTABLE TOY AND COMMUNICATION SYSTEM OF AMUSEMENT FACILITY USING THE SAME

CROSS REFERENCE TO RELATED APPLICATIONS

The present application is a continuation of International application No. PCT/JP2016/087042, filed Dec. 13, 2016, which claims priority to Japanese Patent Application No. 2015-243460, filed Dec. 14, 2015, the entire contents of each of which are incorporated herein by reference.

TECHNICAL FIELD

The present invention relates to a portable toy containing a communication system which interacts with a communication system of an amusement facility using the toy.

BACKGROUND ART

An amusement facility, such as a theme park, typically provides a stereotypical service for each of its visitors. It however is recently desired to provide an individualized services for each of the visitors to further improve the degree of satisfaction of the visitors.

To provide individualized services for each of the visitors, the visitors need to be identified to distinguish visitors from each other. For example, JP 2007-517282 A describes the use of an identification tag having a wrist band-like shape or a bracelet-like shape to allow the amusement park (or the like) to distinguish visitors from each other.

The use of such wrist bands are problematic. To be identified the visitor must place the identification tag in front of a reading device. This causes the visitor to be conscious about the identification tag and the entertainment aspect provided by the amusement facility for the visitors is therefore degraded.

An object of the present invention is to distinguish the visitors from each other without degrading any entertainment experience of the amusement facility.

BRIEF SUMMARY OF THE INVENTION

In order to solve the above problems, according to one aspect of the present invention, there is provided a portable toy that is carried by a visitor of an amusement facility, the portable toy comprising:

a first antenna;

a first transceiver that executes near field communication with a communication terminal installed in the amusement facility through the first antenna;

a second antenna;

a second transceiver that executes far field communication with a mobile terminal associated with the visitor through the second antenna;

a memory that is connected to at least one of the first and the second transceiver; and a controller part that stores information on the visitor received from the mobile terminal by the second transceiver through the second antenna, in the memory.

According to another aspect of the present invention, there is provided a communication system of an amusement facility that comprises a plurality of attractions, the communication system comprising:

a plurality of communication terminals, each communication terminal being disposed in a respective one of the plural attractions;

a mobile terminal that is carried by a visitor at the amusement facility; and a portable toy carried by the visitor, wherein the portable toy comprises a first antenna, a first communication system that executes near field communication with the communication terminal through the first antenna, a second antenna, a second communication terminal that executes far field communication with the mobile terminal carried by the visitor through the second antenna, a memory that is connected to at least one of the first and the second communication systems, and a controller that stores information on the visitor received from the mobile terminal by the second communication system, through the second antenna in the memory, and wherein when the communication terminal acquires the information on the visitor from the portable toy, the attraction that has the communication terminal having the information on the visitor acquired therein, disposed therein provides a service for the visitor based on the information on the visitor.

According to the present invention, in an amusement facility such as a theme park, each of the visitors to the facility can be distinguished from each other without degrading any entertainment experience provided for the visitors.

BRIEF DESCRIPTION OF DRAWINGS

FIG. 4 is a block diagram of the configuration of a communication system of the amusement facility.

DETAILED DESCRIPTION OF THE PREFERRED EMBODIMENTS

Figure 1:
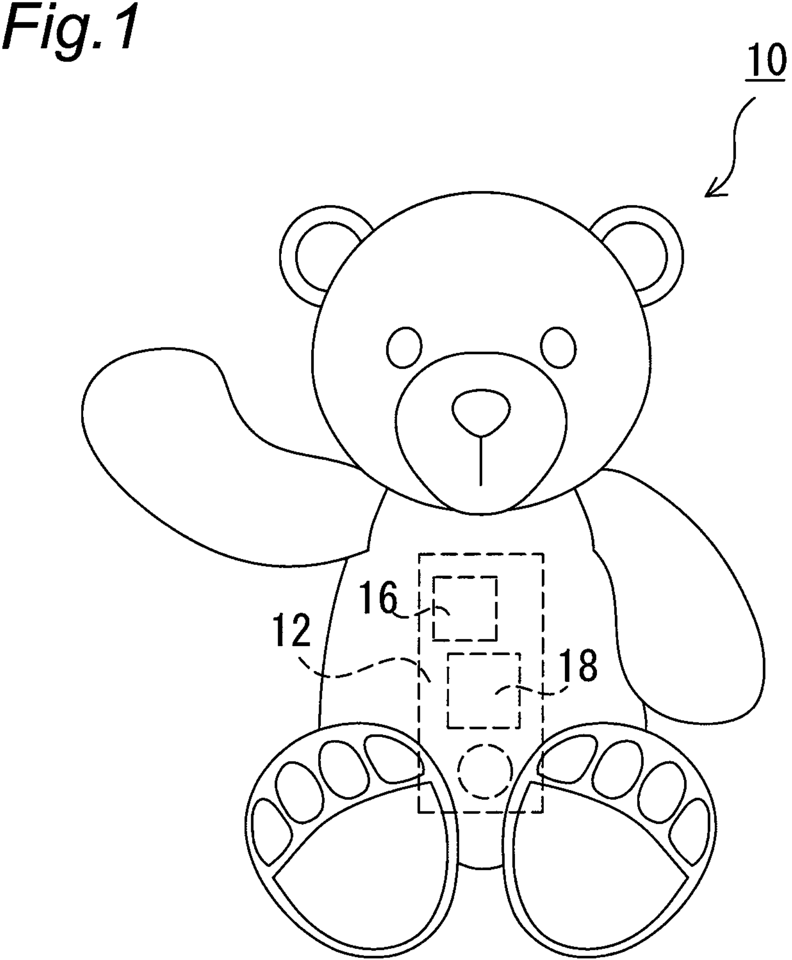
FIG. 1 is a diagram of a portable toy according to an embodiment of the present invention.

"Near field communication" used herein refers to communication executed at a distance of about several cm (equal to 10 cm or shorter) and examples thereof include, for example, FeliCa (a registered trademark) and Transfer-Jet (a registered trademark). On the other hand, "far field communication" refers to communication executed at a distance of several 10 cm to several 10 m (equal to 50 cm or longer) and examples thereof include, for example, Bluetooth (a registered trademark) and a wireless local area network (LAN).

In the "near field communication", a frequency in an HF-band may be used (a UHF-band is however used by Transfer-Jet) and the communication is in principle executed through a dielectric magnetic field. In the "near field communication", a coil antenna is mainly used.

On the other hand, in the "far field communication", a frequency in the UHF-band is typically used and the communication is in principle executed through an electromagnetic wave (an electromagnetic field). In the "far field communication", a standing wave antenna (such as, for example, a dipole antenna, a monopole antenna, a patch antenna, an inverted-F antenna, a plate-shaped inverted-F antenna, an inverted-L antenna, a slot antenna, or a notch antenna) is typically used.

According to one aspect of the invention, each visitor of an amusement facility such as a theme park can be distinguished from other visitors without degrading any entertainment experience provided for the visitors.

The first transceiver of the portable toy may be configured to receive non-contact electric power supply from a communication terminal of the amusement facility through the first antenna, to be driven thereby. In such a configuration, it is not necessary to provide a battery to drive the first transceiver. As a result, the portable toy is lightweight and small and the visitor can both play with and place the portable toy in front of any one of the communication terminals without regard to the toy's weight. As a result, a higher entertainment experience can be provided for the visitor.

The portable toy may be flexible. To this end, the first antenna, the first transceiver, the second antenna, the second transceiver, the memory and the controller are preferably disposed on a flexible substrate. As a result, any loss of the flexibility of the portable toy due to these components is suppressed and any breakage of these components is suppressed when the portable toy is deformed.

When the portable toy is a toy that is in likeness of an animal having hands (and/or feet), the first antenna may be incorporated in an inside of one of the hands (or feet). The visitors can easily be distinguished from each other without interfering with the entertainment experience of the park.

The first transceiver may be configured to execute an electronic payment for a communication terminal that receives the electronic payment through the near field communication. The visitor can shop and dine at a restaurant in a cashless manner by using the portable toy.

The mobile terminal (e.g., a cell phone) can include a camera. In this case, the controller of the portable toy may acquire still and/or video images taken by the camera from the mobile terminal through the second transceiver and may store the so acquired images in the memory. The images taken at the amusement facility can thereby be stored in the portable toy. In this manner the portable toy and the portable toy can be used as an "electronic album".

A communication system of an amusement facility having a plurality of attractions according to another aspect of the present invention has plural communication terminals each of which may be disposed in a respective one of the plural attractions of the amusement facility, a mobile terminal that is carried by (or associated with) a visitor of the amusement facility, and a portable toy carried by the visitor. The portable toy has incorporated therein a first antenna, a first transceiver that executes near field communication with respective communication terminals installed in the amusement facility through the first antenna, a second antenna, a second transceiver that executes far field communication with the mobile terminal carried by (or associated with) the visitor through the second antenna, a memory that is connected to at least one of the first and the second transceivers, and a controller that stores information on the visitor received from the mobile terminal by the second transceiver through the second antenna in the memory, and wherein when the communication terminal acquires the information on the visitor from the portable toy, the attraction that has the communication terminal having the information on the visitor acquired therein, disposed therein provides a service for the visitor based on the information on the visitor.

In an amusement facility such as a theme park, each of the visitors thereof can be identified and therefore distinguished from each other without degrading any entertainment experience provided for the visitors.

The communication system of an amusement facility may have a server that is connected to the communication terminal, the server being capable of communicating with the mobile terminal. In this case, when the communication terminal acquires information concerning the visitor from the portable toy, the server can provide individualized services for the visitor through the mobile terminal associated with the visitor based on this information. For example, the communication system may provide a game or information concerning the attractions to the visitor. The particular game can be determined as a function of the identification of the visitor and the information concerning the attraction can be a function of the location of the visitor (e.g., an attraction for which the visitor is waiting on a line). The visitor can have fun while he or she is waiting on the line using the game and/or learning information about the attraction.

The communication system of an amusement facility may have a use reservation communication terminal to execute near field communication with the first data transceiver of the portable toy which allows the visitor to make a reservation for the attraction, the use reservation communication terminal being connected to the server. In this case, the server preferably notifies the visitor of the time remaining before the reservation time through the mobile terminal. The visitor can thereby use the reserved attraction without forgetting about the reservation. As a result, the visitor can enjoy the reserved attraction at the reserved time and can enjoy other attractions before the reserved time.

Embodiments of the present invention will be described with reference to the drawings.

First Embodiment

This embodiment of the present invention relates to a portable toy carried by a visitor of an amusement facility (such as, for example, a theme park) and a communication system associated with the visitor (such communication system preferably including the portable toy and a mobile terminal associated with, for example carried by, the visitor) and a communication system of the amusement facility.

The mobile terminal can be carried by the visitor carrying the portable toy or by someone associated with the visitor carrying the portable toy. For example, the portable toy can be carried by a child and the mobile terminal can be carried by the child's parent. Byway of further example, the portable toy and the mobile terminal may be carried by a group whose members act together.

FIG. 1 depicts a portable toy according to a first embodiment of the present invention. The portable toy 10 is, for example, a stuffed toy or a doll. In this embodiment, the portable toy 10 is a stuffed toy in the likeness of a bear. It is preferred that the portable toy 10 be in the likeness of a shape that corresponds to the service provided by the amusement facility such as, for example, a character of the amusement facility especially to maintain the appreciation of the world provided by the amusement facility for the visitor.

As depicted in FIG. 1, a communicating device 12 which communicates with the communication system of the amusement facility is incorporated inside of the portable toy 10. This communicating device 12 will be described.

Figure 2:
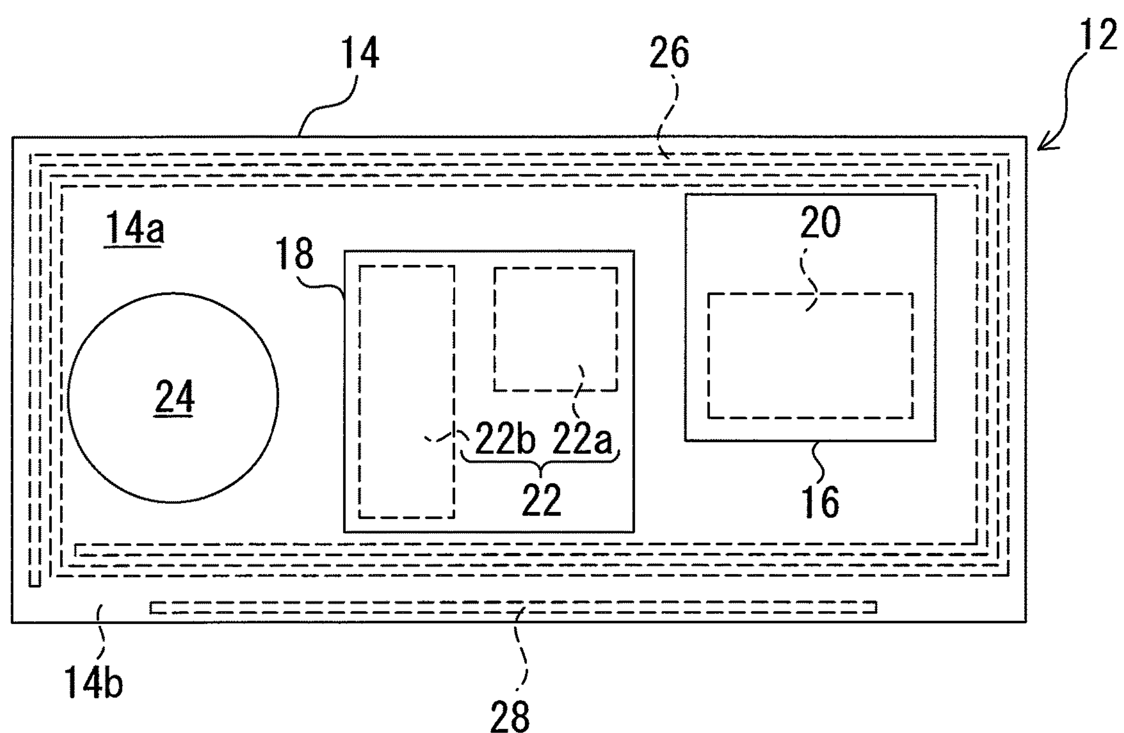
FIG. 2 is a schematic diagram of a communicating device incorporated in the portable toy depicted in FIG. 1.
Figure 3:
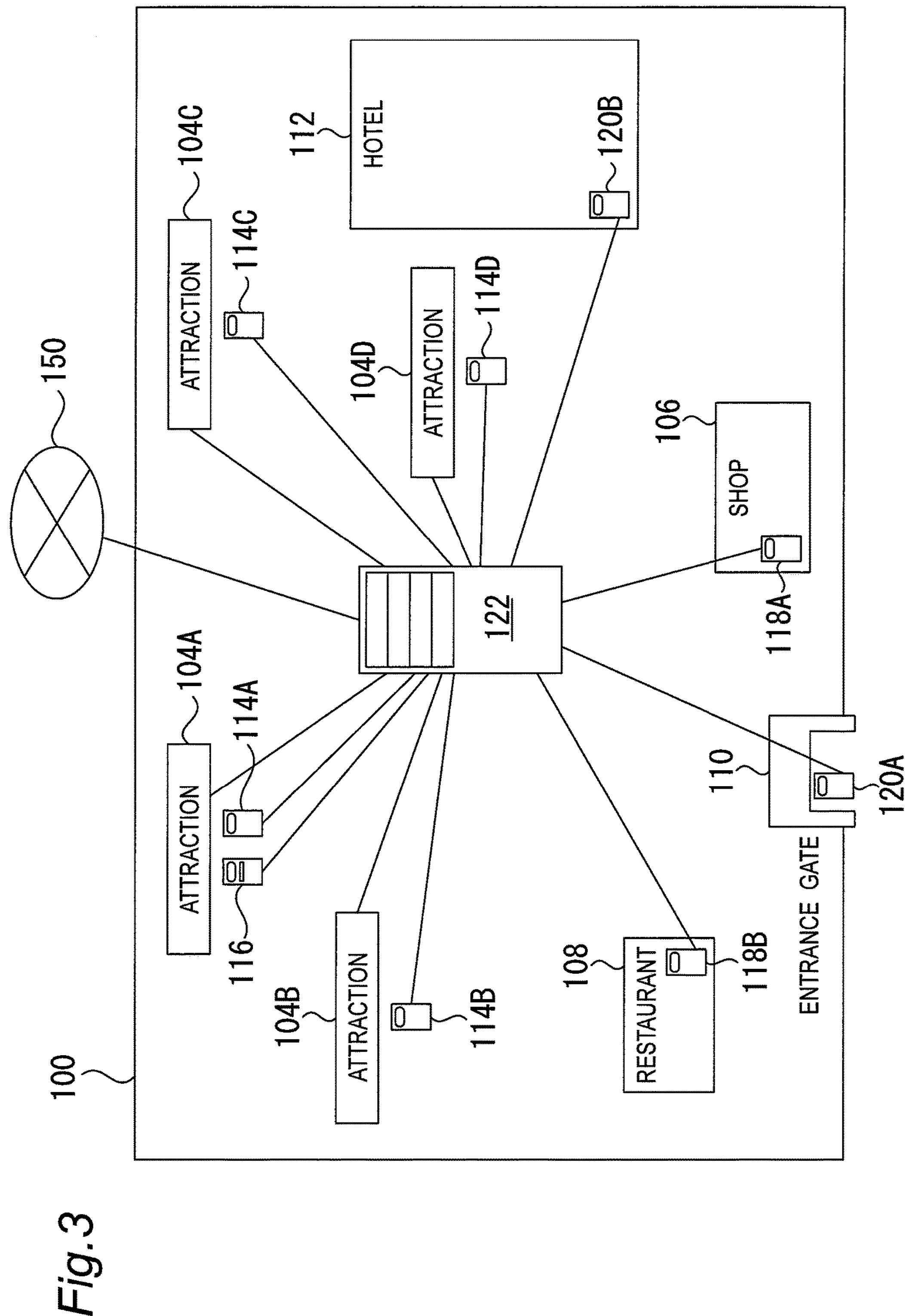
FIG. 3 is a schematic diagram of the configuration of an amusement facility.

FIG. 2 is a schematic diagram of one embodiment of the communicating device 12. FIG. 3 is a schematic diagram of the configuration of the amusement facility. FIG. 4 is a block diagram of the configuration of the communication system of the amusement facility that communicates with the visitor's communicating device 12 and the mobile terminal.

As depicted in FIG. 2, the communicating device 12 includes a flexible substrate 14. A first transceiver 16, a second transceiver 18, a memory 20, a controller 22 and a battery 24 are mounted on one surface (the principal surface) 14*a* of the flexible substrate 14.

The flexible substrate 14 of the communicating device 12 of the portable toy 10 can be, for example, a multi-layered substrate configured by stacking resin films of polyimide or the like on each other, and has flexibility. When the portable toy 10 has flexibility (for example, when the portable toy 10 is a stuffed toy), any degradation of the flexibility of the portable toy 10 due to the communicating device 12 incorporated in the portable toy 10 is suppressed (compared to the case where the substrate 14 is a non-deformable substrate such as, for example, a ceramic substrate). Any breakage of the communicating device 12 inside the portable toy 10 having the flexibility can be suppressed by deformation of the portable toy 10.

The first transceiver 16 of the communicating device 12 is, for example, a high-frequency circuit that executes transmission, reception, modulation, and demodulation of an RF signal and is constituted by, for example, an integrated circuit (IC) chip disposed on the principal surface 14*a* of the flexible substrate 14. As will hereinafter be described in detail, the first transceiver 16 is configured to be able to execute the near field communication with plural communication terminals disposed at various locations in the amusement facility 100.

The second transceiver 18 of the communicating device 12 can be, for example, a high-frequency circuit that executes transmission, reception, modulation, and demodulation of an RF signal and is, for example, included in a module that is attached to the principal surface 14*a* of the flexible substrate 14. As depicted in FIG. 4, the second transceiver 18 is directly or indirectly connected to the first transceiver 16. As will hereinafter be described in detail, the second transceiver 18 is configured to be able to execute the far field communication with the mobile terminal (see element 50 in FIG. 4).

The memory (which may be a single or a distributed memory) 20 is connected to at least one of the first and the second transceivers 16 and 18. The first and the second transceivers 16 and 18 can access the information (data) stored in the memory 20. In this embodiment, the memory 20 is preferably disposed in the first transceiver 16 (in its IC chip) as a memory circuit to be integrated therewith (formed as one chip). The memory 20 may be disposed in the second transceiver 18 instead of the first transceiver 16, or may be disposed in both thereof. Alternatively, the memory 20 may be disposed at a location exterior to the first and the second transceivers 16 and 18.

The controller 22 of the communicating device 12 is configured to control the first and the second transceivers 16 and 18. In this embodiment, the controller 22 includes a CPU 22*a* that is disposed in the second transceiver 18 (its module) and a memory 22*b* that has a program to control the CPU 22*a* stored therein. The controller 22 may be disposed as a control circuit in the first transceiver 16 (the IC chip) instead of the second transceiver 18. Otherwise, the controller 22 may be disposed in each of both of the first and the second transceivers 16 and 18. Furthermore, the controller 22 may be disposed at a location exterior to the first and the second transceivers 16 and 18.

The battery 24 (which is optional) of the communicating device 12 of the portable toy 10 is preferably a replaceable or a rechargeable electrical cell battery (such as, for example, a button battery) and is preferably mounted on the flexible substrate 14. In this embodiment, the battery 24 supplies driving electric power to the first transceiver 16 and the second transceiver 18 when necessary. When the first transceiver 16 is a passive system (a battery-less system—e.g., an RFID system), the battery 24 only has to supply the driving electric power to the CPU 22*a* of the controller 22 of the second transceiver 18.

The amusement facility 100 will be described with reference to FIG. 3. In this embodiment the amusement facility 100 has a plurality of attractions 104A to 104D, a shop 106, a restaurant 108, an entrance gate 110, and a hotel 112.

The plurality of attractions 104A to 104D have respective attraction communication terminals 114A to 114D disposed therein (more generally, associated therewith). One attraction 104A has a use reservation communication terminal 116 disposed therein (more generally associated therewith) for a visitor to a make reservation for use of the attraction 104A. The shop 106 and the restaurant 108 have respective electronic payment communication terminals 118A and 118B disposed therein (more generally associated therewith) to execute electronic payments. Furthermore, the entrance gate 110 and the hotel 112 have respective electronic locking devices 120A and 120B disposed therein (more generally associated therewith) to electronically lock the entrance gate 110 and a room of the hotel 112. These attractions, the communication terminals, and the like are connected to a server 122. The details of these components will be described later.

As depicted in FIG. 4, the first transceiver 16 of the communicating device 12 of the portable toy 10 is configured to execute near field communication with each of the attraction communication terminals 114A to 114D, the use reservation communication terminal 116, the electronic payment communication terminals 118A and 118B, and the electronic locking devices 120A and 120B.

For example, the first transceiver 16 and each of the attraction communication terminals 114A to 114D, the use reservation communication terminal 116, the electronic payment communication terminals 118A and 118B and the electronic locking device 120A and 120B are configured to execute the near field communication therebetween for which the communication connection is automatically established when the first transceiver 16 and each of the terminals/devices approach each other.

In this embodiment, the first transceiver 16 is preferably configured to be driven by receiving non-contact electric power supply from each of the attraction communication terminals 114A to 114D, the use reservation communication terminal 116, the electronic payment communication terminals 118A and 118B, and the electronic locking devices 120A and 120B when the first transceiver is located adjacent any one of those devices. For example, the first transceiver 16 is a passive RFID chip that utilizes the radio frequency identification (RFID) technology (is, for example, an FeliCa chip). The first transceiver 16 cooperates with a first antenna described later, to constitute an RFID tag.

In this embodiment, as depicted in FIG. 2, the communicating device 12 has the first antenna 26 having a coil-like shape disposed therein as an antenna for the first transceiver 16. The first antenna 26 is preferably formed on a back face of the flexible substrate 14 (the face opposing the principal surface 14*a*) or is incorporated within the flexible substrate 14. Similarly, a coil-like antenna is disposed in each of the attraction communication terminals 114A to 114D, the use reservation communication terminal 116, the electronic payment communication terminals 118A and 118B, and the electronic locking devices 120A and 120B that each communicate with the first transceiver 16.

Figure 5:
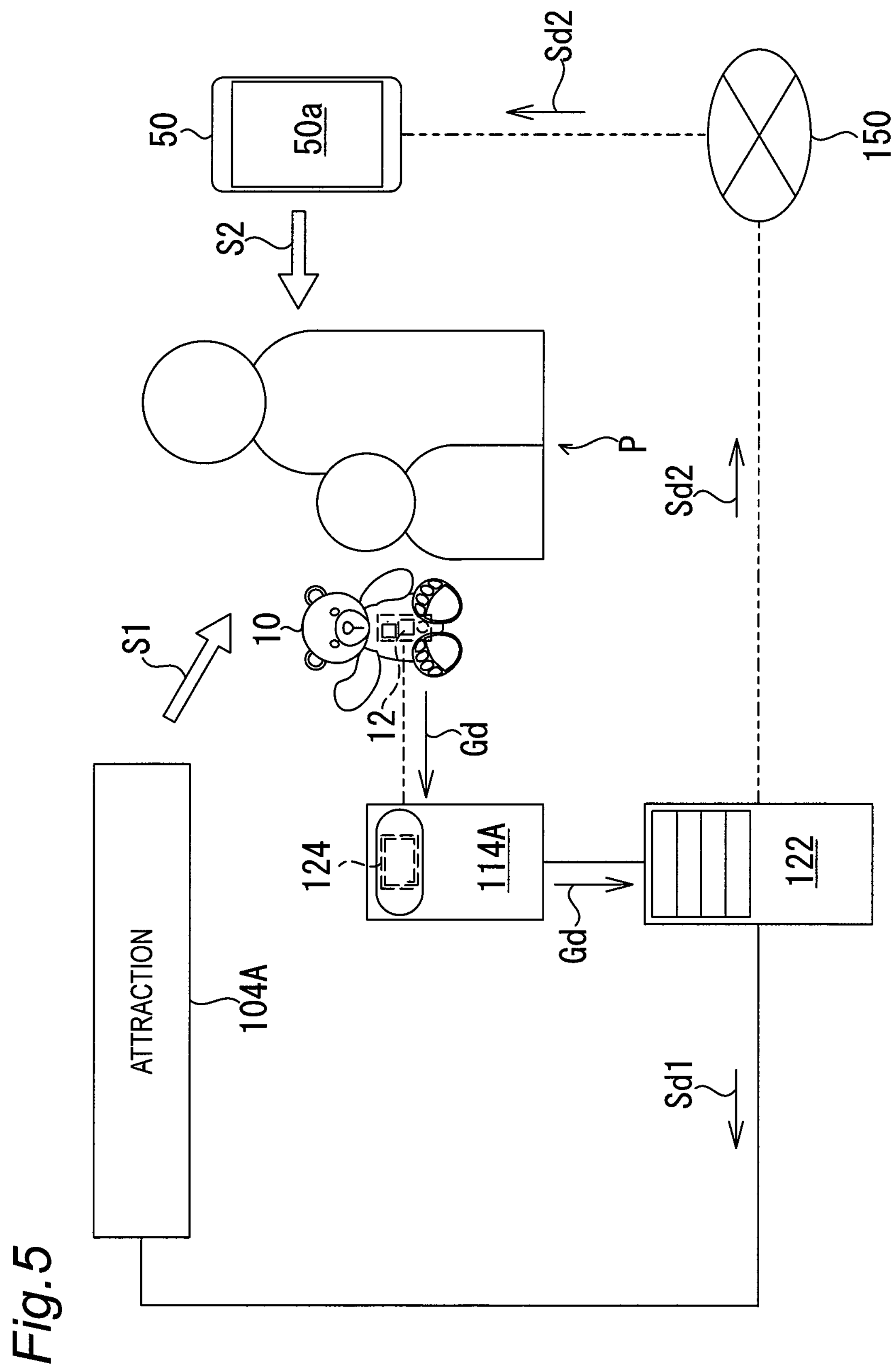
FIG. 5 is a diagram for explaining a service provision method of an attraction through the portable toy.

For example, when a visitor P places the portable toy 10 close to (e.g., in front of) the attraction communication terminal 114A as shown in FIG. 5 and the first antenna 26 of the communicating device 12 is thereby arranged in a magnetic field generated by a coil-shaped antenna 124 of the attraction communication terminal 114A. An induction current thereby flows through the first antenna 26 of the communicating device 12 and the first transceiver 16 is driven by the induction current. The first transceiver 16 receives the non-contact electric power supply from the communication terminal 114B and is thereby driven. The driven first transceiver 16 outputs a signal through the first antenna 26.

The signal transmitted from the first transceiver 16 through the first antenna 26 is received through the antenna 124 associated with the attraction communication terminal 114B and the attraction communication terminal 114B thereby detects the presence of the portable toy 10 (more particularly, the communicating device 12). A communication connection is thereby established between the first antenna 26 of the first transceiver 16 and the antenna 124 of the attraction communication terminal 114A. As a result, the attraction communication terminal 114A can read and write data from/into the memory 20 in the first transceiver 16 (the chip) (that is, functions as a reader/writer). The details of the information that is transmitted and received between the first transceiver 16 and the attraction communication terminal 114A will be described below.

To reliably establish the communication connection between the first antenna 26 and the antenna 124 of the attraction communication terminal 114A, the communicating device 12 is preferably incorporated in the portable toy 10 such that the side of the first antenna 26 does not face the side of the center (inside) of the portable toy 10 but faces the outside thereof. The communicating device 12 is incorporated in the portable toy 10 such that (preferably) none of the other components of the communicating device that might interfere with the communication between the portable toy 10 and the attraction communication terminal 114 is present between the two antennas 26 and 124.

In this embodiment, as will hereinafter be described in detail, the first transceiver 16 is configured to be able to execute the near field communication with each of the electronic payment communication terminals 118A and 118B that are disposed in the shop 106 and the restaurant 108 to each accept electronic payments, and to be able to execute the electronic payments through the communication terminals 118A and 118B. The memory 20 has information stored therein that is related to the electronic payment (such as, for example, information on the balance of the electronic money and/or the debit account number).

In this embodiment, as will hereinafter be described in detail, the first transceiver 16 is configured to be able to execute the near field communication with the electronic locking devices 120A and 120B disposed in the entrance gate 110 and the hotel 112 to be able to unlock the electronic locks of the electronic locking devices 120A and 120B. The memory 20 in the first transceiver 16 has the information stored therein to unlock the electronic locks.

As depicted in FIG. 4, the second transceiver 18 is configured to execute the far field communication with the mobile terminal 50.

The mobile terminal is a terminal that is associated with the visitor P who is carrying the portable toy 10 and that has a far field communication function, and is, for example, a smartphone. The mobile terminal 50 can preferably be connected to the Internet 150 and into which applications (pieces of software) can be installed. As depicted in FIG. 5, the mobile terminal 50 preferably includes a touch panel display 50*a* which functions as both an input and an output device.

As depicted in FIG. 4, to execute the far field communication between the second transceiver 18 and the mobile terminal 50, a second antenna 28 is preferably disposed on the flexible substrate 14 as depicted in FIG. 2 as an antenna for the second transceiver 18. The second antenna 28 is, for example, a monopole antenna.

The mobile terminal 50 is mainly used to make the initial setting for the portable toy 10 to be usable in the communication system of the amusement facility. For example, the mobile terminal 50 is used to record (register) visitor information Gd related to the visitor P in the memory 20.

As depicted in FIG. 1, the portable toy 10 preferably does not include any input part such as buttons to register the visitor information Gd into the memory 20 or any output part, such as a display, to check the content of the input. These functions are preferably carried out by the mobile terminal 50.

By way of example, the visitor information Gd may include the name, the age and the sex of the visitor P and the e-mail address and password of the mobile terminal 50.

Figure 6:
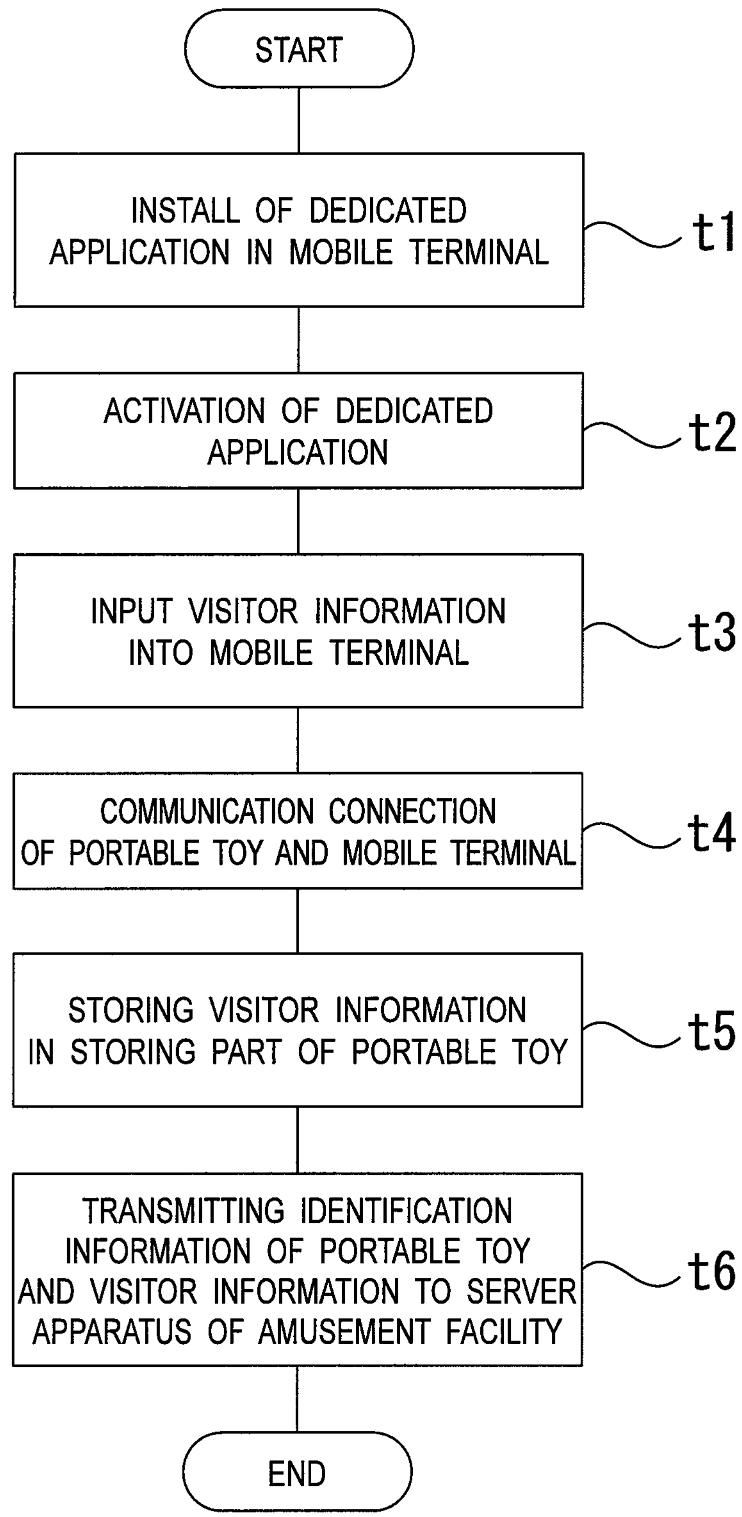
FIG. 6 is a flowchart of the flow of an example of the initial setting of the portable toy.

An example of the manner in which the portable toy 10 may be initially set will be described with reference to a flowchart depicted in FIG. 6. The portable toy 10 may be, for example, commercially available or sold in the shop 106 in the amusement facility 100.

First, a dedicated application is downloaded into the mobile terminal 50 associated with the portable toy 10 (step t1) through the Internet 150.

The visitor P then activates the installed dedicated application (step t2).

The mobile terminal 50 displays an input screen which allows the visitor to input the visitor information Gd on the touch panel display part 50*a* of the mobile terminal 50. The visitor P inputs the visitor information Gd through the input screen (step t3).

To register the input visitor information Gd into the portable toy 10, a communication connection is established between the second transceiver 18 of the communicating device 12 of the portable toy 10 and the mobile terminal 50 (step t4). For example, when the far field communication therebetween is Bluetooth communication, pairing is executed.

When the communication connection is established between the second transceiver 18 and the mobile terminal 50, the dedicated application transmits the visitor information Gd (which has been input into the mobile terminal 50) from the mobile terminal 50 to the second transceiver 18 through the second antenna 28. The transmitted visitor information Gd is preferably stored (registered) in the memory 20 by the controller 22 (step t5).

The mobile terminal 50 acquires identification information (e.g., the identification number) from the portable toy 10 through the second transceiver 18 of the communicating device 12, and transmits the acquired identification information of the portable toy 10 and the visitor information Gd to the server 122 of the amusement facility 100 through the Internet 150 (step t6). The server 122 stores the identification information of the portable toy 10 and the visitor information Gd correlating these pieces of information with each other. The initial setting of the portable toy 10 is thereby completed and the portable toy 10 retains the visitor information Gd of the visitor P carrying the portable toy 10.

A preferred method for using the portable toy 10 and communicating between portable toys communicating device 12 and the amusement facility's communication system will now be described.

As above, the visitor information Gd of the visitor P who carries the portable toy 10 is registered in the portable toy 10. The visitor P carrying the portable toy 10 can therefore be distinguished by the visitor information Gd stored in the portable toy 10. With this information, the communication system 102 of the amusement facility 100 can provide individualized services for each visitor P.

For example, as depicted in FIG. 5, when the visitor P places the portable toy 10 in front of the attraction communication terminal 114A disposed in (or near) the attraction 104A, a communication connection is established between the first transceiver 16 of the communicating device 12 of the portable toy 10 and the attraction communication terminal 114A. The attraction communication terminal 114A thereby reads (acquires) the visitor information Gd stored in the portable toy 10.

The attraction communication terminal 114A having the acquired visitor information Gd therein transmits the visitor information Gd to the server 122. The server 122 transmits service information (data) Sd1 based on the visitor information Gd to the attraction 104A that has the attraction communication terminal 114B acquiring the visitor information Gd, disposed therein (or associated therewith).

The attraction 104A having the service information Sd1 received therein provides a service S1 based on the service information Sd1 (that is, based on the visitor information Gd) for the visitor P who carries the portable toy 10. For example, when the attraction 104A is a robot capable of having a conversation, the robot speaks to the visitor P using the name of the visitor P included in the visitor information Gd. Byway of another example, when a video image is provided as the service S1, the video image is provided that is suitable for the sex and the age of the visitor P included in the visitor information Gd. In this manner, the communication system 102 of the amusement facility 100 can provide targeted (individual) services to the visitor P. As a result, the visitor P can enjoy the attraction 104A more (compared to the case where a single service is provided to all of the visitors).

The communication system 102 of the amusement facility 100 provides targeted, individual services for not only the first visitor P who uses the attraction but also to any other visitor P who has his or her own portable toy 10 and places it next to the communication terminal 114A.

For example, as depicted in FIG. 5, when a second visitor P who is in line to use the attraction 104A places his or her portable toy 10 in front of the communication terminal 114A of the attraction 104A (when the near field communication is executed), the second visitor information Gd is transmitted from the other portable toy 10 of the second visitor to the server 122 through the communication terminal 114A. The server 122 transmits an e-mail to the second visitor P using the e-mail address in the transmitted visitor information Gd associated with the second visitor. When the second visitor P accesses an address described in the e-mail, for example, a mini game and information (data Sd2) concerning the attraction 104A are provided for the second visitor P through a second portable terminal 50. As a result, the second visitor P can also have fun while waiting on line. When a push notification can be transmitted to the mobile terminal 50 through the dedicated application, the game, the information, and the like may be provided without using the e-mail address.

As depicted in FIG. 3, for the visitor P to make a reservation for use of an attraction, the amusement facility 100 (the communication system 102 thereof) includes the use reservation communication terminal 116 that accepts the reservation. In this embodiment, the use reservation communication terminal 116 is disposed in the attraction 104A (more generally is associated with the attraction 104A) to make the reservation for the use of the attraction 104A, and is connected to the server 122.

When the visitor P making the reservation for the use of the attraction 104A places his or her portable toy 10 in front of the use reservation communication terminal 116 (when the near field communication is executed), the visitor information Gd is transmitted from the first transceiver 16 of the portable toy 10 to the server 122 through the use reservation communication terminal 116. The server 122 determines the reservation time of the visitor P who makes the reservation this time, based on availability (e.g., based on previous reservation times made by other visitors). The server 122 transmits the information concerning the reservation time to the use reservation communication terminal 116 and notifies the visitor P of the reservation time. The use reservation communication terminal 116 notifies the visitor P of, for example, the reservation time by printing the reservation time on a paper sheet.

When the reservation time approaches (for example, 15 minutes before the reservation time), the server 122 notifies the visitor P who made the reservation that his or her reservation time is approaching. At this time, the server 122 gives the notice through the mobile terminal 50 carried by (or associated with) the visitor P. For example, an e-mail informing the visitor that his or her reservation time is approaching is transmitted to the mobile terminal 50 of the visitor P. The visitor P can thereby use the reserved attraction 104A without forgetting about the reservation. As a result, the visitor P can enjoy the reserved attraction 104A and can enjoy other attractions before the reservation time. When the a push notification can be transmitted to the mobile terminal 50 through the dedicated application, the dedicated application may give a notice to the effect that the reservation time comes soon, without using the e-mail address.

As depicted in FIG. 3, to provide an electronic payment service for the visitor P carrying the portable toy 10, the amusement facility 100 (the communication system 102 thereof) includes the electronic payment communication terminals 118A and 118B for the visitor P to execute the electronic payments. In this embodiment, the electronic payment communication terminals 118A and 118B are disposed in the shop 106 and the restaurant 108, and are connected to the server 122.

When the visitor P places the portable toy 10 in front of each of the electronic payment communication terminals 118A and 118B in the shop 106 and the restaurant 108 (when the near field communication is executed), the information related to the electronic payment service (such as, for example, information on the balance of the electronic money and the debit account number) is transmitted from the first transceiver 16 of the portable toy 10 to the server 122 through the electronic payment communication terminals 118A and 118B, and is further transmitted from the server 122 to a server (not depicted) of the company that provides the electronic payment service. When the electronic payment is completed, the completion is notified of to the visitor P through the electronic payment communication terminals 118A and 118B. The visitor P can thereby shop and dine in the cashless manner. To increase security, the electronic payment communication terminals 118A and 118B may each include an input part (not shown) which allows the visitor P to input a password. The electronic payment is executed when the password stored in the server 122 as part of the visitor information Gd or a password set by the visitor P for the company that provides the electronic payment service is input into the input part of each of the electronic payment communication terminals 118A and 118B.

To open the entrance gate 110, or to unlock the door lock of a room of the hotel 112, the amusement facility 100 (the communication system 102 thereof) includes electronic locking devices 120A and 120B. These electronic locking devices 120A and 120B are connected to the server 122.

When the visitor P places the portable toy 10 in front of either of the electronic locking devices 120A and 120B of the entrance gate 110 and the hotel 112 (when the near field communication is executed), the visitor information Gd is transmitted from the first transceiver 16 of the portable toy 10 to the server 122 through each of the electronic locking devices 120A and 120B. The server 122 authenticates that the visitor P is a person who is admitted into the amusement facility 100 and/or the room of the hotel 112, based on the visitor information Gd. When the authentication is completed, the server 122 transmits an electronic lock unlocking signal to the appropriate electronic locking devices 120A and 120B to unlock them. The visitor P carrying the portable toy 10 can thereby pass through the entrance gate 110 to enter the amusement facility 100 or can enter the room of the hotel 112.

According to this embodiment as above, the visitor P can be identified in the amusement facility 100 without degrading the entertainment experience provided for the visitor P and individual services can be provided for the so identified visitor.

For example, the visitor P can place the portable toy 10 in front of each of the attraction communication terminals 114A to 114D, the use reservation communication terminal 116, the electronic payment communication terminals 118A and 118B, and the electronic locking devices 120A and 120B. When he or she does so, each of the communication terminals and the like can accesses the memory 20 in the first transceiver 16 of the communicating device 12 incorporated in the portable toy 10 and can acquire the information on the visitor P carrying the portable toy 10 (the visitor information Gd). Any individualized service can thereby be provided for the visitor P based on the acquired visitor information Gd.

For example, when the portable toy 10 is a stuffed toy in the likeness of a bear as depicted in FIG. 1, a stuffed toy in the likeness of a dog is attached to the attraction communication terminal 114A. The visitor P is caused to arrange his or her portable toy 10 to face the stuffed toy in the likeness of a dog fixed to the attraction communication terminal 114A (the communication terminal 114A urges the visitor P to do as above). While the stuffed toys are being arranged in this manner, the communication terminal 114A accesses the memory 20 of the first transceiver 16 of the communicating device 12 incorporated in the portable toy 10 and acquires the information on the visitor P carrying the portable toy 10 (the visitor information Gd). The information on the visitor P can be acquired from the portable toy 10 when the visitor P variously plays with the portable toy 10, by attaching the stuffed toys in the likeness of animals each different from each other, to the communication terminals. The visitor P can therefore be distinguished without degrading the entertainment experience provided by the amusement facility 100 for the visitor P (providing a higher entertainment experience), and targeted, individual services can be provided for the visitor P (compared to, for example, the identification tag).

In the preferred embodiment, the first transceiver 16 of the communicating device 12 incorporated in the portable toy 10 is configured to be driven by receiving the non-contact electric power supply from each of the attraction communication terminals 114A to 114D, the use reservation communication terminal 116, the electronic payment communication terminals 118A and 118B, and the electronic locking devices 120A and 120B. When this is done the communicating device 12 does not need a battery to drive the first transceiver 16. As a result, the portable toy 10 is lightweight and small, and the visitor P can place the portable toy 10 in front of the communication terminal playing with the portable toy 10 without regard to its weight. As a result, the amusement facility 100 can provide a higher entertainment experience for the visitor.

The portable toy 10 used to identify, and therefore distinguish, the visitor P in the amusement facility 100 can be played with as a "toy" even after the visitor P exits the amusement facility 100. The portable toy 10 may thereby cause the visitor P to have a desire to revisit the amusement facility 100. In contrast, for example, when the identification tag is used to distinguish a visitor, no use is present for the identification tag after the visitor exits the amusement facility.

While the present invention has been described with reference to the foregoing embodiment, the invention is not limited to that embodiment.

Various modifications can be made, for example, when the portable toy 10 is a toy such as a stuffed toy in the likeness of an animal or a doll that has hands and feet, the first antenna may be incorporated in a hand thereof.

Figure 7:
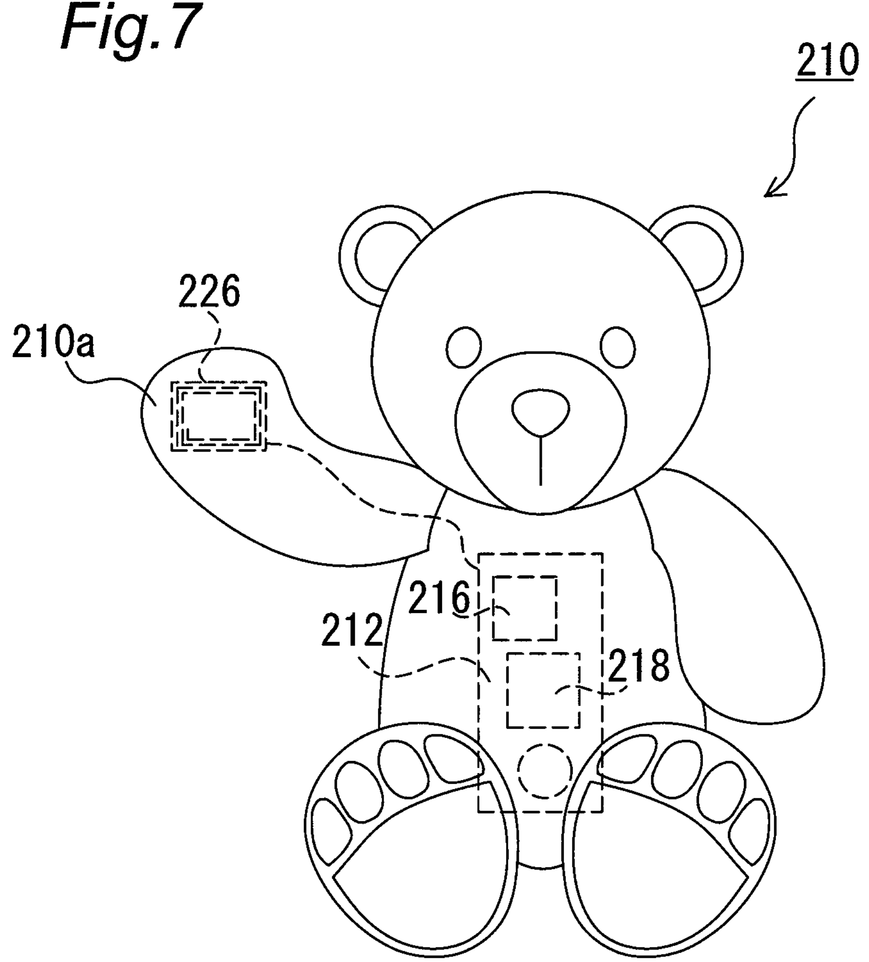
FIG. 7 is a diagram of the portable toy according to another embodiment.

For example, FIG. 7 depicts a portable toy according to another embodiment of the invention. As depicted in FIG. 7, the portable toy 210 is a stuffed toy in the likeness of a bear, and a first antenna 226 of a first transceiver 216 of a communicating device 212 is incorporated in the right hand (the right front foot) 210*a* of the stuffed toy. The information concerning the visitor P is acquired by the communication terminal when the right hand 210*a* of the stuffed toy is placed in front of the communication terminal (such as, for example, the attraction communication terminal 114A) of the amusement facility 100. This allows the visitor P to be identified enabling the amusement facility to provide a higher entertainment experience to the visitor P by incorporating the first antenna 226 to execute the near field communication with the communication terminal in the right hand 210*a* of the portable toy 210 as above.

The communicating device incorporated in the portable toy may include a plurality of first transceivers and, in this case, the first antennas may be arranged in different locations of the portable toy. For example, the first antenna of the one first transceiver can be arranged in the right hand (the right front foot) of the stuffed toy in the likeness of a bear and the first antenna of the other transceiver can be arranged in the left hand (the left front foot) of the bear. Different services can be provided to the visitor as a function of which of the bear is placed in front of the communication terminal. To this end, each of the first transceivers can transmit different identification signals to the communication terminal through the corresponding first antenna and it can thereby be determined which first antenna executes the near field communication with the communication terminal.

The portable toy may be configured to store still and/or movable images received from a camera of the mobile terminal of the visitor carrying the portable toy. For example, the controller part of the communicating device incorporated in the portable toy may receive images from the camera of the mobile terminal through the second transceiver and may store the acquired shot image in the memory. Alternatively, the images received from the camera may be stored in another memory contained in the portable toy. For example, the shot image of the camera may be stored in an electrically erasable programmable read-only memory (EEPROM) mounted in the communicating device. The shot images can be managed being correlated with the portable toy and the portable toy can be used as an “electronic album”.

Preferably, the portable toy does not include input buttons and a display screen such as, for example, a handheld gaming device, and the mobile terminal to register the visitor information is therefore necessary in the portable toy. The portable toy is, for example, a stuffed toy, a doll, or a figure but is not limited to those which have the likeness of a living thing. For example, the portable toy may have the likeness of a passenger transportation vehicle such as, for example, an automobile or an airplane. To maintain the appreciation of the world provided by the amusement facility, it is preferred that the portable toy be the one that is in the likeness of a character of the amusement facility. Furthermore, it is preferred that the portable toy be not a toy that is attached to the body of the visitor (such as, for example, an arm thereof) to be used but be a toy that can freely be released from the visitor’s hand and be a toy that can stand on the communication terminal, not to limit the degree of freedom of any playing using the portable toy.

The mobile terminal to register the information on the visitor into the portable toy does not need to be the mobile terminal owned by the visitor. The mobile terminal may be, for example, a mobile terminal lent by the amusement facility to the visitor. The mobile terminal according to the embodiments of the present invention is a mobile terminal carried by the visitor in the amusement facility.

The invention claimed is:

1. A portable toy that is carried by a visitor of an amusement facility, the portable toy comprising: a first antenna; a first transceiver that executes communication with a communication terminal installed in the amusement facility through the first antenna; a second antenna; a second transceiver that executes communication with a mobile terminal the visitor through the second antenna; a memory that is connected to at least one of the first and the second transceivers; and a controller that stores information associated with the visitor received from the mobile terminal by the second transceiver through the second antenna in the memory;

wherein the mobile terminal uploads information entered into the mobile terminal into both the portable toy and a server of the amusement facility, wherein the information uploaded to the mobile terminal comprises personal information and the information unloaded to the amusement park server includes at least some of the personal information uploaded into the portable toy and information about the portable toy itself.

2. The portable toy according to claim 1, wherein the first transceiver of the portable toy is configured to receive non-contact electric power supply from a communication terminal of the amusement facility through the first antenna, to be driven thereby.

3. The portable toy according to claim 1, wherein:

the portable toy has flexibility; and the first antenna, the first transceiver, the second antenna, the second transceiver, the memory, and the controller are disposed on a flexible substrate.

4. The portable toy according to claim 1, wherein:

the portable toy is a toy that is in likeness of an animal having hands; and the first antenna is incorporated in an inside of a hand of the animal.

5. The portable toy according to claim 1, wherein the first transceiver is configured to execute an electronic payment for a communication terminal that receives the electronic payment through the communication.

6. The portable toy according to claim 1 wherein:

the mobile terminal includes a camera; and the controller acquires images taken by the camera from the mobile terminal through the second transceiver and stores the acquired shot images in the memory.

7. A communication system of an amusement facility that comprises a plurality of attractions, the communication system comprising: a plurality of communication terminals, each of the communication terminals being associated with a respective one of the plurality of attractions; a mobile terminal that carried by a visitor of the amusement facility; and a portable toy carried by the visitor, the portable toy comprising: a first antenna; a first transceiver that executes communication with the communication terminals through the first antenna, a second antenna, a second transceiver that executes communication with the mobile terminal associated with the visitor through the second antenna; a memory that is connected to at least one of the first and the second transceivers, and a controller that stores information on the visitor received from the mobile terminal by the second transceiver through the second antenna, in the memory, and wherein when the communication terminal acquires the Information on the visitor from the portable toy, the attraction that is associated with the communication terminal having the information on the visitor acquired therein provides an individual service for the visitor based on the information on the visitor;

wherein the mobile terminal unloads information entered into the mobile terminal into both the portable toy and a server of the amusement facility;

wherein the information unloaded to the mobile terminal comprises personal information and the information unloaded to the amusement nark server includes at least some of the personal information uploaded into the portable toy and information about the portable toy itself.

8. The communication system of an amusement facility according to claim 7, further comprising a server that is connected to the communication terminal, the server being capable of communicating with the mobile terminal, wherein when the communication terminal acquires the information on the visitor from the portable toy, the server provides an individualized service for the visitor through the mobile terminal of the visitor, based on the information on the visitor.

9. The communication system of an amusement facility according to claim 8, wherein the communication system provides a game or information in relation to the attraction that corresponds to the communication terminal having the information on the visitor acquired therein, as the service provided through the mobile terminal.

10. The communication system of an amusement facility according to claim 8, further comprising a use reservation communication terminal to execute communication with the first transceiver of the portable toy and make a reservation of use of the attraction by the visitor carrying the portable toy, the use reservation communication terminal being connected to the server, and wherein the server notifies of a remaining time period up to a reservation time through the mobile terminal.

* * * * *